United States Patent Office 3,038,819
Patented June 12, 1962

3,038,819
ANTIBIOTICS AS PRESERVATIVES FOR INDUSTRIAL MATERIALS
Sidney H. Ross and Leonard Teitell, Philadelphia, Pa., assignors to the United States of America as represented by the Secretary of the Army
No Drawing. Filed Aug. 25, 1958, Ser. No. 757,167
2 Claims. (Cl. 117—138.5)
(Granted under Title 35, U.S. Code (1952), sec. 266)

The invention described herein may be manufactured and used by or for the Government for governmental purposes without the payment to us of any royalty thereon.

This invention relates to a process for enhancing the resistace of industrial materials subject to fungus attack and to the products resulting therefrom and has as an object to present a process whereby industrial materials can be made to have enhanced resistance to microbial attack while at the same time having a low degree of skin-irritating properties for humans who handle such treated materials, and to products resulting therefrom.

Some of the problems encountered by prior art processes for the protection of industrial products and equipment from microbial attack are that the agents used to inhibit fungus growth have skin-irritating effects upon handlers; the compounds had a deteriorating effect upon the products to which they were applied; they were lacking in permanence; and due to their color they were limited in their application to the color of the finally produced article.

We have discovered that certain antibiotics which we have tested when dissolved in a proper solvent and applied to certain industrial products display low skin-irritating properties to man; little or no deteriorating effect upon the products to which they are added; indicate a reasonable amount of permanence; and have a color which permits them to be used with almost any color article.

Of the many difficulties encountered by the prior art in attempting to solve the problem of microbial attack, the foremost is skin-irritating effect of the additive upon man. If the concentration of the compound is reduced to the point that it is non-irritating to man, the impregnated product has little resistance to microbial deterioration after a short period of time. We have determined through tests of several antibiotics that they have overcome many of the prior art problems; that is, a concentration of antibiotics may be used which achieves a reasonable degree of permanence while at the same time has no apparent skin-irritating effect upon man. The percentage of antibiotic added to the materials tested is small enough so that the ultimate properties of the material are not affected. Endomycin, filipin, fungichromin, thiolutin and rimocidin were considered among the best. The 2% solution of inhibitor was considered the maximum concentration which would not cause any significant change in the physical characteristics of the material to which it was added.

The following tests were conducted to determine the effect of the antibiotics upon the various organic materials.

SOIL BURIAL TEST OF ANTIBIOTIC-TREATED PAPER

Fungichromin, filipin, endomycin, and rimocidin were dissolved in appropriate solvents (methyl, ethyl, propyl or butyl alcohol), and the antibiotic thiolutin was dissolved in cyclohexanone. To treat paper, 0.2 ml. of antibiotic solution was pipetted onto 1 inch by 3 inch strips of filter paper. One or more applications were made where the antibiotic was not sufficiently soluble. The strengths of the solutions were adjusted so that the treated papers contained 0.5%, 1% or 2% of antibiotic based on the weight of the paper after the solvent was evaporated.

The antibiotic treated papers were exposed to the microbial flora present in biologically active soil by means of a one-week soil burial test method No. 5762 Mildew Resistance of Cloth, Soil Burial Method, described in Federal Specifications CCC–T–191b. Breaking strength determinations were made according to TAPPI Method T404m–50 in order to determine the percent strength retained by the paper after the exposure period. The results are shown in Chart I.

Filter paper is considered representative of cellulosic materials, in general, being a highly susceptible test medium.

Chart I

EFFECTIVENESS OF ANTIBIOTICS IN PREVENTING MICROBIAL DETERIORATION OF FILTER PAPER AFTER A ONE-WEEK SOIL BURIAL TEST

A. Effective inhibitors:

| Antibiotics— | Strength (percent) retained by treated filter paper [1] |
|---|---|
| 0.5% endomycin | 61 |
| 2.0% endomycin | 72 |
| 0.5% filipin | 70 |
| 2.0% filipin | 72 |
| 0.5% fungichromin | 65 |
| 2.0% fungichromin | 81 |
| 0.5% thiolutin | 62 |
| 1.0% thiolutin | 81 |
| 1.0% rimocidin | 62 |

[1] Average of three replicates.

FUNGUS RESISTANCE OF ANTIBIOTIC TREATED OIL

Castor oil was used as a test vehicle to determine the inhibitory effect of the antibiotics upon fungus growth in oils due to the excellent ability of castor oil to support the growth of microbial flora. For this reason, castor oil was considered as a severe test of the antibiotics on inhibiting fungal growth in oils and plasticizers capable of supporting microbial growth.

The test compounds were ground to a fine particle size by means of mortar and pestle and thoroughly mixed with castor oil to provide three concentrations, 0.5%, 1% and 2%, of antibiotic by weight. The oil containing the antibiotic was inoculated with a mixed, washed fungus spore suspension consisting of the following organisms: Trichoderma sp. (American Type Culture Collection No. 9645), Aspergillus niger (ATCC No. 6275), Aspergillus flavus (ATCC No. 9643), and Penicillium funiculosum (ATCC No. 9644), and incubated on a nutrient-salts agar at 29°±1° C. at 95% relative humidity for six weeks.

The results of the castor oil test indicated that of the antibiotics tested only fungichromin and endomycin were effective as inhibitors of fungus growth for oils and plasticizers. Fungichromin was completely effective at 2% and partially inhibitory at 1%. Endomycin was found to be superior, being inhibitory at 1% and partially inhibitory at 0.5%.

FUNGUS RESISTANCE OF ANTIBIOTIC-TREATED CORK

Glue-bonded cork was considered as representative of proteinaceous materials including such materials as leather and adhesives having a proteinaceous base.

One-sixteenth inch thick glue-bonded cork was cut into specimens ½ inch x 2 inches. The cork specimens were then suspended in the antibiotic solutions for a sufficient period of time to allow the concentration of antibiotic based on the weight of specimens after drying to reach 0.5%, 1% or 2% (about five minutes treatment time was required for 0.5% concentration).

The specimens were sprayed with a mixed fungus spores suspension consisting of the following fungi: Trichoderma sp. (American Type Culture Collection No. 9645), *Aspergillus niger* (ATCC No. 6275), *Aspergillus flavus* (ATCC No. 9643), and *Penicillium funiculosum* (ATCC No. 9644), and incubated in jars over water at a nominal 100% relative humidity, at a temperature of 29° C.±1° C., for a period of six weeks. The results indicate that 0.4% by weight rimocidin and 0.6% by weight thiolutin treated specimens resulted in no fungus growth on the surface of the specimens at the end of the test period. One percent endomycin and 2% filipin and fungichromin permitted only light to moderate fungus growth at the end of the test period. Those skilled in the art will understand that the names of the antibiotics are descriptive names and not trade names.

We claim:

1. In a process for rendering cellulosic materials generally permanently resistant throughout to severe microbial attack and yet having no apparent skin-irritating effects upon man, the steps comprising dissolving thiolutin in cyclohexanone, impregnating said cellulosic materials with said thiolutin in solution and evaporating the cyclohexanone such that the treated cellulosic materials contain at least about 0.5% thiolutin by weight.

2. In a process for rendering proteinaceous materials generally permanently resistant throughout to severe microbial attack and yet having no apparent skin-irritating effects upon man, the steps comprising dissolving thiolutin in cyclohexanone, impregnating said proteinaceous materials with said thiolutin in solution and evaporating said cyclohexanone such that the proteinaceous materials contain at least about 0.6% thiolutin by weight.

References Cited in the file of this patent

UNITED STATES PATENTS

| | | |
|---|---|---|
| 2,602,042 | Abbott | July 1, 1952 |
| 2,680,701 | Cusumano | June 8, 1954 |
| 2,804,425 | Smith | Aug. 27, 1957 |
| 2,805,975 | Hamilton | Sept. 10, 1957 |
| 2,809,149 | Cusumano | Oct. 8, 1957 |
| 2,830,011 | Parker | Apr. 8, 1958 |
| 2,951,014 | Gorman | Aug. 30, 1960 |

OTHER REFERENCES

Ammann: Applied Microbiology, pp. 181–186, May 1955.

C.A., vol. 47, 153, p. 9573a.

ACS, Abstracts of Papers, 124th Meeting, Chicago, Ill., Sept. 6 to 11, 1953, pp. 24–31A.